Feb. 6, 1968  G. KLEIN  3,368,089
MAGNETOHYDRODYNAMIC GENERATORS WITH SEGMENTED ELECTRODES
Filed Oct. 13, 1964  2 Sheets-Sheet 2
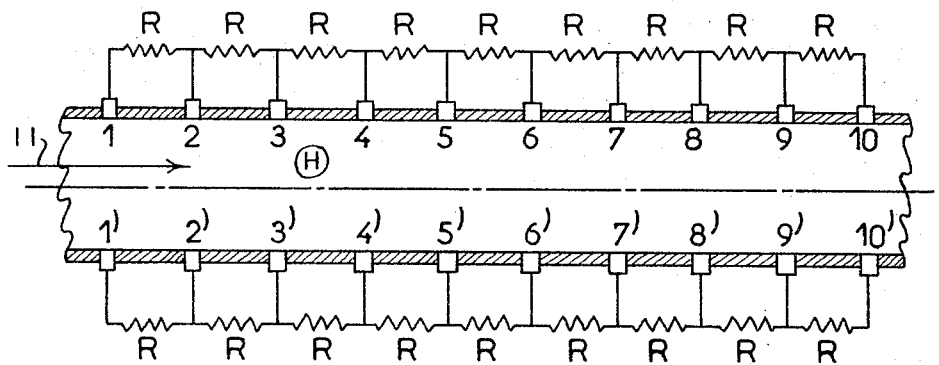
FIG. 3
FIG. 4
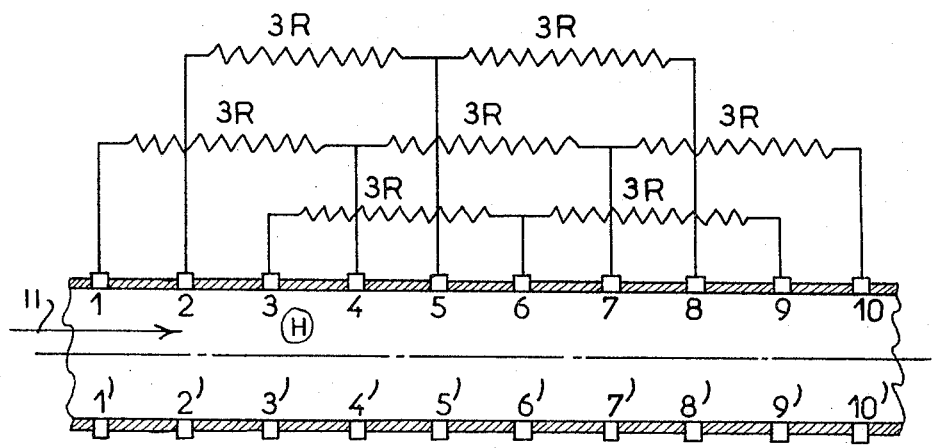

United States Patent Office 3,368,089
Patented Feb. 6, 1968

3,368,089
MAGNETOHYDRODYNAMIC GENERATORS
WITH SEGMENTED ELECTRODES
Georges Klein, Paris, France, assignor to Compagnie
Generale d'Electricite, Paris, France, a corporation
of France
Filed Oct. 13, 1964, Ser. No. 403,496
Claims priority, application France, Oct. 24, 1963,
951,657
10 Claims. (Cl. 310—11)

ABSTRACT OF THE DISCLOSURE

A magnetohydrodynamic generator with segmented electrodes in which a discharge is effected for creating an electric arc between adjacent electrodes and means along one side of the magnetohydrodynamic channel. Pairs of the electrodes are connected to the secondary windings of respective transformers having their primary windings connected to an alternating voltage source. Also, in the case when the voltages originating through the Hall effect between the electrodes located along the same side of the channel are sufficiently high, the electrodes are then connected to each other by resistances with no ancillary current supply being required.

One knows magnetohydrodynamic generators of the so-called "segmented electrodes" type, including on two opposite longitudinal faces of the channel in which flows the magnetohydrodynamic fluid, a succession of electrodes isolated one from another.

It is known that, in a magnetohydrodynamic generator, the boundary layer in contact with the cold electrodes has a lower temperature than the temperature of the center of the gaseous stream, and, as a result, the conductivity is lower in this boundary layer.

Various means have been put forward to increase the conductivity of this boundary layer. In particular, the applicant did suggest, in his French Patent No. 1,330,199 of May 7, 1962, that an electric discharge be created between ancillary electrodes arranged in an ancillary channel adjacent to the magnetohydrodynamic channel and communicating with the latter, by applying between said ancillary electrodes an alternating electric voltage tapped off at the terminals of the secondary winding of a transformer fed through some current supply.

The generator in accordance with this invention, which is a generator with segmented electrodes is remarkable in that it comprises means for creating an electric arc directly between said electrodes arranged on one same side of the main magnetohydrodynamic channel.

With such an arrangement, and because of the increase of the current density at the electrodes which it enables to achieve, said electrodes can remain cold. The electrodes may be metallic or of any other substance. It is also possible to increase the density of the delivered current by using electrodes of the so-called "consumable" type or of ceramic electrodes.

In a first embodiment of a generator according to the invention, the electrodes between which a discharge is to be created are, as in the patent quoted above, connected to the secondary windings of transformers, the primary windings of which are connected to an ancillary source of alternating electric voltage.

In a second embodiment, which may be used when the voltages originating, through the Hall effect, between the electrodes located on one same face of the channel, are sufficiently high (it is the case if the Hall effect coefficient $\beta$ is greater than 2), the electrodes are then simply connected one to the other by resistances, no special ancillary current supply being required.

Figure 1:
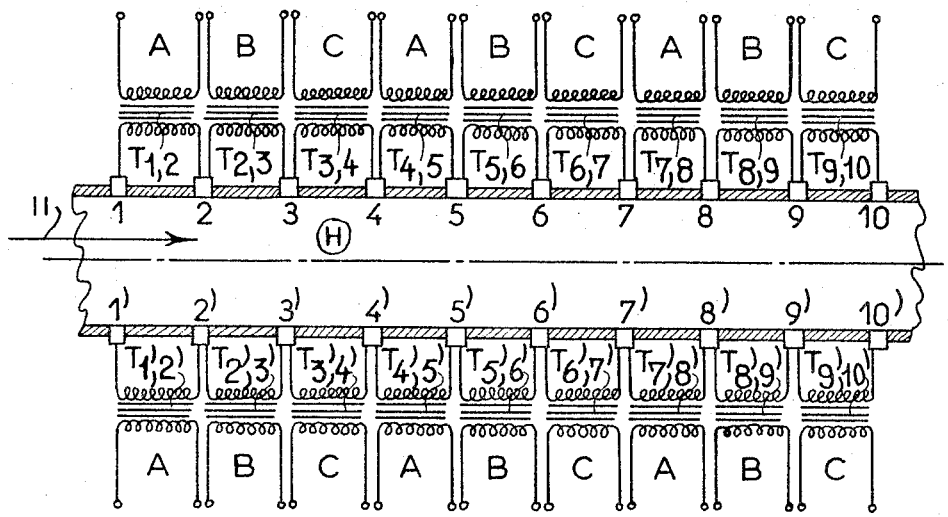
Figure 2:
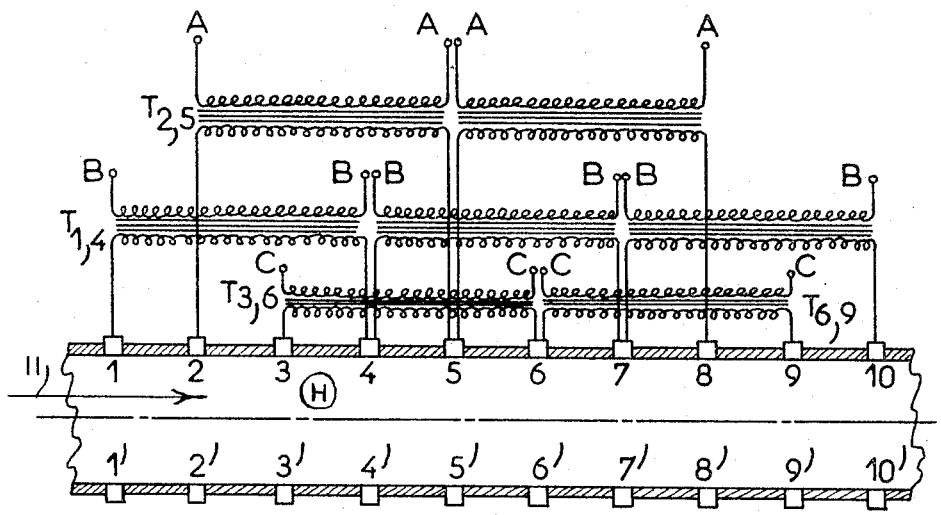

FIGURES 1 and 2 show schematically two variants of the first embodiment, and FIGURES 3 and 4 show schematically two variants of the second embodiment.

In all these figures, 1, 2 . . . 10 designate the electrodes of one side of the channel, and 1', 2' . . . 10' designate the electrodes, opposite the former, on the other side of the channel. The magnetohydrodynamic generator utilized with this invention is of the known type in which the main channel is usually of a rectangular cross-section with the sides of the generator having conductive strips, such as electrodes 1–10 above described, and separated from each other by suitable insulating spacing means. Each of the electrodes 1–10 is electrically connected through a suitable load by means of a suitable conductor to the electrode directly opposite the channel, for example, at 1, 1', 2, 2', 3, 3', etc. A magnetic field is established in the direction H by any suitable means (not shown), and the partially ionized gas is caused to flow through the channel in the direction of the arrow 11. For a more detailed description of this type of known generator configuration and of which this invention forms no part, reference is made to the J. D. Cobine et al. Patent 3,149,247.

In the variant according to FIGURE 1, each electrode on one side of a channel is connected to the next electrode by the secondary winding of a transformer, the primary winding of which is connected to a non shown alternating voltage supply. Thus, the electrodes 1 and 2 are connected together via the secondary winding of a transformer $T_{1,2}$, the electrodes 2 and 3 via that of a transformer $T_{2,3}$ . . . etc. If there are $n$ electrodes on each side of the channel, there must be obviously 2 ($n-1$) transformers, which, obviously, may possibly have the same primary windings.

The alternating current supplying the pirmary windings of the transformers may be of any type, single-phase or polyphase. In the arrangement according to FIGURE 1, this current is three-phase; A, B, C designate symbolically the three phases: the transformer $T_{1,2}$ is supplied from the phase A, the transformer $T_{2,3}$ from the phase B, the transformer $T_{3,4}$ from the phase C, the transformer $T_{4,5}$ from the phase A . . . etc.

FIGURE 2 shows another variant, wherein the electrodes connected to the terminals of the secondary winding of a transformer instead of being adjacent as in the case of FIGURE 1, are separated by a number of intermediate electrodes.

In this example, the electrodes 1 and 4 are connected to the secondary winding of a transformer $T_{1,4}$, the primary winding of which is supplied from the phase B of a three-phase voltage supply; the electrodes 2 and 5 are connected to the secondary winding of a transformer $T_{2,5}$, the primary winding of which is supplied from the phase A of said three-phase voltage supply; the electrodes 3 and 6 are connected to the secondary winding of a transformer $T_{3,6}$, the primary winding of which is supplied from the phase C of said source, etc.

It will be appreciated that, in such an arrangement, the space called "boundary layer" between the electrodes 3 and 8 is subjected to an electric field created by the three windings supplied respectively from the three phases A, B, C, the resultant of which is, on principle, zero; only the spaces between the three electrodes of the two groups (1, 2, 3) and (8, 9, 10) located respectively at each end of the channel are not subjected to these three fields and, hence, they are subjected to a resultant electric field which generates there Joule effect losses. It will be appreciated that the arrangement adopted enables to cut down these losses to a minimum.

Whichever be the variant used, it is obvious that the primary circuits of the transformers must include current limiters, except when they have a high reactance.

FIGURES 3 and 4 illustrate examples of the second embodiment, comprising no ancillary current supply for creating discharges.

FIGURE 3 shows the simplest example, in which each electrode is connected to the next one via a resistance R. In such an arrangement, the discharge will obviously occur between two electrodes such that the difference between the potentials therein generated through the Hall effect be higher than or at least equal to the voltage required for initiating an arc between said electrodes through the "boundary layer." Actually, due to the presence of this conductive "boundary layer," the breakdown voltage between two electrodes is in fact the breakdown voltage between one electrode and said layer: it is hence constant and independent of the distance between the electrodes.

Under these conditions, should, for example, said breakdown voltage be 150 volts, and should the potential difference originating from the Hall effect between two adjacent electrodes be 50 volts, the discharge cannot occur between said adjacent electrodes but only between electrodes separated by two intermediate electrodes and between which, consequently, the potential is $3 \times 50 = 150$ volts, i.e., the electrodes 1 and 4, 2 and 5 . . . etc.

The first variant is to be preferred when the value of the Hall voltage between adjacent electrodes is not known beforehand, or when this voltage is variable i.e., when one cannot forecast for a certainty between which electrodes the arcing will take place.

In the inverse case, a variant may be advantageously used, whereby the two electrodes between which it is known that the discharge will occur are connected together by a single resistance. This arrangement enables to cut down the number of resistances. Considering the same case as in the previous numerical example, the arrangement according to FIGURE 4 would be obtained, wherein the electrodes 1 and 4, 2 and 5, 3 and 6, 4 and 7 . . . are connected together by resistances of value 3 R.

Whichever be the variant used, the resistances must be selected so that, on one hand, the total ohmic value of the series connected resistances be large as compared to the "longitudinal internal resistance" of the generator, and that, on the other hand, the current flowing in the resistances be sufficient to ensure a positive discharge between the corresponding electrodes without however borrowing too much energy from the generator.

What I claim is:

1. A magnetohydrodynamic generator comprising a channel means having two opposing faces, said channel means confining a conducting fluid during its flow therethrough, means providing a magnetic field in said channel having lines of flux transverse to the direction of fluid flow, a plurality of electrodes isolated one from the other positioned on said channel means and in contact with the ionized fluid within said channel, said electrodes being spaced along said channel in the direction of fluid flow, means connected to said electrodes for creating arcing between said electrodes along at least one of said opposing faces of said channel means, whereby the potential drop between opposing electrodes in said channel means is reduced and the current density between said electrodes is increased.

2. A magnetohydrodynamic generator as claimed in claim 1, wherein said arcing means is an ancillary alternating electric voltage connected between two electrodes.

3. A magnetohydrodynamic generator as claimed in claim 2, wherein the ancillary voltage is applied between two adjacent electrodes.

4. A magnetohydrodynamic generator as claimed in claim 2 wherein the ancillary voltage is applied between two electrodes separated by other electrodes.

5. A magnetohydrodynamic generator as claimed in claim 2 wherein the ancillary alternating voltage is single-phase.

6. A magnetohydrodynamic generator as claimed in claim 2 wherein the ancillary alternating voltage is polyphase.

7. A magnetohydrodynamic generator as claimed in claim 1 wherein the electrodes are paired off, each pair being supplied from a phase of a three-phase current, the various pairs overlapping along the channel, whereby the resultant electric field and the corresponding Joule losses are substantially zero.

8. A magnetohydrodynamic generator as claimed in claim 1 wherein said arcing means is a resistance connected between two electrodes, the potential difference between said two electrodes originating from the Hall effect being at least equal to the voltage required for initiating an arc therebetween through the boundary layer.

9. A magnetohydrodynamic generator as claimed in claim 8 wherein each electrode is connected by said resistance to an adjacent electrode.

10. A magnetohydrodynamic generator as claimed in claim 8 wherein each electrode is connected by said resistance to that one of the other electrodes for which the voltage generated by the Hall effect between said electrodes is at least equal to the puncture voltage of the boundary layer in front of said electrodes.

References Cited

UNITED STATES PATENTS

| | | | |
|---|---|---|---|
| 3,095,163 | 6/1963 | Hill | 244—12 |
| 3,149,247 | 9/1964 | Cobine | 310—11 |
| 3,170,077 | 2/1965 | Blackman | 310—11 |

FOREIGN PATENTS

| | | |
|---|---|---|
| 1,330,199 | 5/1963 | France. |

DAVID X. SLINEY, *Primary Examiner.*